United States Patent [19]

Cordes

[11] Patent Number: 4,693,554
[45] Date of Patent: Sep. 15, 1987

[54] SENSOR MAGNIFYING GLASS APPARATUS

[75] Inventor: Werner Cordes, Hamburg, Fed. Rep. of Germany

[73] Assignee: Aristo Graphic SySteme GmbH & Co. KG, Fed. Rep. of Germany

[21] Appl. No.: 871,986

[22] Filed: Jun. 9, 1986

[30] Foreign Application Priority Data

Jun. 7, 1985 [DE] Fed. Rep. of Germany ....... 3520293

[51] Int. Cl.$^4$ .................. G02B 7/02; G08C 21/00
[52] U.S. Cl. .................................. 350/244; 178/19
[58] Field of Search .................. 350/114–116, 350/243–245; 340/709–710; 33/DIG. 1, 1 C, 1 M, 18.1; 178/18–19

[56] References Cited

U.S. PATENT DOCUMENTS

| 1,900,332 | 3/1933 | Coradi et al. | 33/18.1 |
| 2,026,176 | 12/1935 | Jaeckel | 350/245 |
| 2,104,198 | 1/1938 | Jones | 350/245 |
| 2,826,959 | 3/1958 | Schneider | 350/243 |
| 3,801,733 | 4/1974 | Bailey | 178/19 |
| 3,876,301 | 4/1975 | Kosugi et al. | 355/53 |
| 3,892,963 | 7/1975 | Hawley et al. | 250/231 R |
| 3,897,635 | 8/1975 | Peren et al. | 33/1 C |
| 3,983,629 | 10/1976 | Scharenberg, Jr. | 33/1 M |
| 4,194,084 | 3/1980 | Hetzel | 178/19 |
| 4,479,032 | 10/1984 | Parnell | 178/19 |
| 4,543,571 | 9/1985 | Billbrey et al. | 340/710 |
| 4,561,183 | 12/1985 | Shores | 33/1 M |

FOREIGN PATENT DOCUMENTS

| 212221 | 8/1984 | German Democratic Rep. |
| 0076901 | 6/1980 | Japan . |

Primary Examiner—William H. Punter
Attorney, Agent, or Firm—David H. Semmes; Warren E. Olsen

[57] ABSTRACT

An improved sensor magnifying glass apparatus having a magnifying glass element (1) held in a holder element (4) and comprising a cylindrical portion (2) with a superposed convex curved lens portion (3) that is rotationally symmetrical with the cylinder axis (19). A plotter coil (11) is secured to the cylindrical portion (2) in the region between that portion's circumferential face and the course of a peripheral light ray (20') through the cylindrical portion (2) that enters the lens portion (3).

6 Claims, 3 Drawing Figures

SENSOR MAGNIFYING GLASS APPARATUS

BACKGROUND OF THE INVENTION

1. Field of the Invention

The present invention relates to a sensor apparatus having a magnifying glass element held in a holder element. The magnifying glass element has a cylindrical portion and a superposed convex lens portion thereon which is rotationally symmetrical with respect to the cylinder axis. The sensor magnifying glass also includes a plotter coil, which is coaxial with the cylinder portion.

2. Brief Description of Prior Art

Sensor magnifying glasses of this type are used together with digitizing tables, for example, for determining the spatial location of points located on drawings on the digitizing table and for storing these coordinates electrically in a memory so they readily can be picked up.

Typically, the known sensor magnifying glasses have a housing forming the holder element, into which the magnifying glass element is set; the plotter coil is secured to the underside of the housing, i.e., the side that comes to rest on the digitizing table. The plotter coil is connected to a circuit arrangement in the housing, and on top of the housing actuating buttons are provided for controlling and triggering the various electrical functions.

The housing is typically made of nontransparent material, so that only in the area of the magnifying glass element itself is the user able to recognize details of the drawing underneath and make the appropriate alignment with respect to the cross-hairs in the magnifying glass element. The coil is located on the underside of the magnifying glass element and interferes with the view of the drawing underneath.

OBJECT AND SUMMARY OF THE INVENTION

It is accordingly to object of the invention to improve a sensor magnifying glass in such a way that the coil does not interfere with observation of the drawing underneath.

To attain this object, a sensor magnifying glass of the above generic type is embodied according to the invention such that the plotter coil is secured to the cylindrical portion in the region between the circumferential face of that portion and the course of a peripheral light ray entering the lens portion, as it passes through the cylindrical portion. Preferably, the plotter coil is secured in a groove in the circumferential wall of the cylindrical portion.

Thus, in a sensor magnifying glass according to the invention, the magnifying glass element serves as the holder for the plotter coil. Nevertheless, the plotter coil is not visible to the user, who is observing the drawing underneath the magnifying glass element, because it is disposed in the region between the circumferential face of the cylindrical portion and the course through this portion of a peripheral light ray entering the lens portion. That is, a ray of light striking the outer edge of the lens portion vertically, relative to the drawing underneath, is refracted inward toward the cylinder axis by the lens body in such a way that the region remaining between this refracted ray and the outer circumferential face of the cylindrical portion is not perceptible to the observer because of the optical course of the peripheral ray. Consequently the plotter coil, which is also disposed in this region, is not visible either, yet the observer does not have the impression that a portion of the lens body is "invisible".

A particularly simple embodiment is attained by inserting the cylindrical portion into a through bore in the holder and securing it there, for example with adhesive.

In such a case, if the holder element is of an acrylic plastic, then the drawing underneath is also perceptible through the holder element, while in the vicinity of the defining surface of the through bore in the holder element there is total reflection, so that even looking through the holder element obliquely from the side, the plotter coil is not perceptible.

The invention will be described in greater detail below in conjunction with the drawings, showing an exemplary embodiment.

DESCRIPTION OF THE PREFERRED EMBODIMENT

Figure 1:
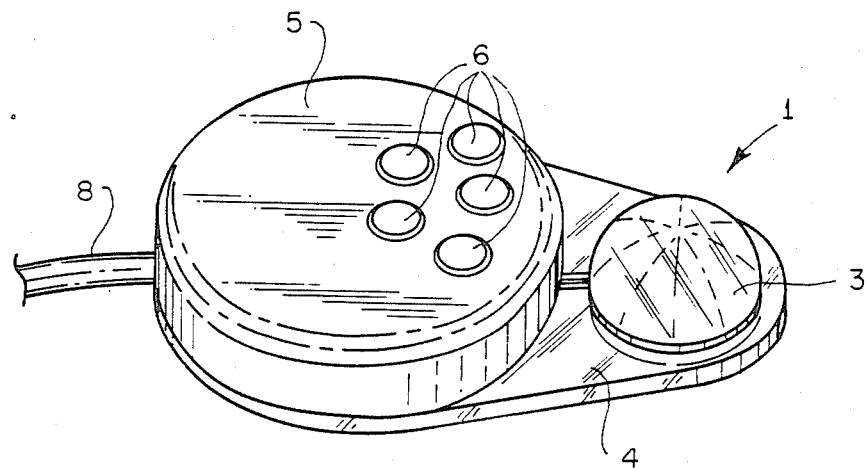
FIG. 1 is a perspective view of a sensor magnifying apparatus according to the present invention.

The sensor magnifying glass shown in the drawings has a flat holder element 4 of clear acrylic plastic, on which a housing 5 is secured by means of screws 7. Located in the housing 5 is the evaluation, or plotter, circuit, the function of which is triggered by means of the buttons 6 provided on the top of the housing 5 which in turn are connected via a cord 8 to a processing circuit. The design and function of the evaluation circuit are known and therefore will not further be explained.

A through bore is located in the holder element 4 and a lens element 1, which, for example, may also be made of an optical material such as acrylic plastic, is inserted into the through bore. The lens element 1 comprises a cylindrical portion 2 and a superposed lens portion 3, which is convex curved and rotationally symmetrical relative to the cylinder axis 19.

Figure 2:
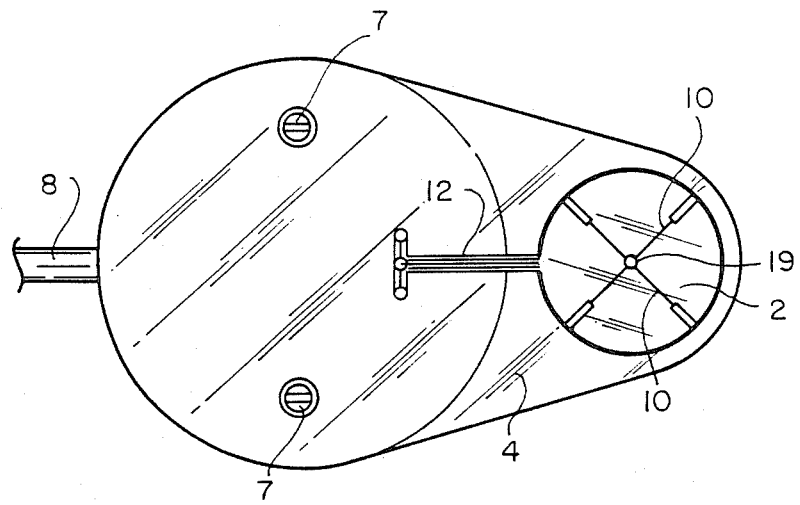
FIG. 2 shows the sensor magnifying glass of FIG. 1 from below.
Figure 3:
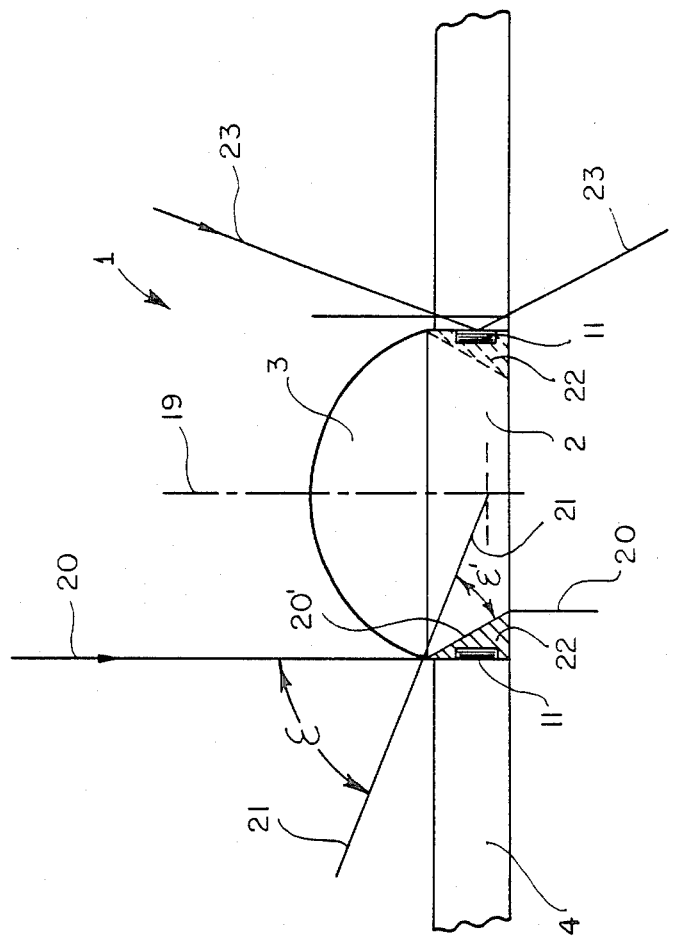
FIG. 3, in a fragmentary sectional view, shows the course of rays through the magnifying glass of FIGS. 1 and 2.

In the lower face of the cylindrical portion 2, as seen in FIG. 2, there are crosshairs 10, the center point of which is located on the cylinder axis 19. A plotter coil 11 is mounted in an annular groove in the outer circumferential face of the cylindrical portion 2 of the lens element 1 and is located, as shown in FIG. 3, in the vicinity of the holder element 4 when the lens element 1 has been inserted into the holder element 4. The coil 11 conventionally is connected to the evaluation circuit in the housing 5 via connecting leads 12 (FIG. 2) that extend through a groove, not shown.

The lens element 1 may be retained in the holder element 4 with adhesive, for example.

As shown in FIG. 3, a peripheral light ray 20 striking the surface of the lens portion 3 at an angle $\epsilon$ (with respect to a line 21 normal to the peripheral region of that portion of the lens) and also perpendicular to the surface on which the holder element 4 rests, is refracted relative to the lens normal line 21, and passes through the lens element at an angle $\epsilon'$ relative to the normal in the form of the ray 20', until it reaches the lower surface of the cylindrical portion 2 and emerges from it in the form of the ray 20 at right angles to the lower surface of the holder element 4 and parallel to the original peripheral ray 20. As a result, a region 22 is created, (between the outer circumferential region of the cylindrical portion 2 and the ray segment 20′), in which it can be appreciated no ray of light extending parallel to peripheral ray 20 can enter. Therefore, a plotter coil 11 located in the region 22 cannot be seen when looking through the magnifying glass element through the lens portion 3.

It will be understood that the size of the region 22 is naturally dependent on the curvature of the outer surface of the lens portion 3 and on the material of which the magnifying glass element 1 is made.

It is also apparent from FIG. 3 that the plotter coil 11 cannot be seen when looking from the side. As the ray 23 indicates, total reflection occurs, at the defining surface of the through bore of the holder element 4, for rays passing through the holder element 4, thereby resulting in "invisibility" of the plotter coil 11 secured to the magnifying glass element 1. This total reflection occurs over a relatively large angle of inclination of light rays 23, the size of this angle of inclination depending on the material making up the transparent holder element 4.

An auxiliary light source (not shown) may be juxtapositioned above and near the lens portion, and supported upon the holder, in order to provide enhanced illumination of the drawing underneath the holder.

While a preferred embodiment of the invention has been shown and described, the invention is to be defined by the scope of the appended claims.

I claim:

1. A sensor magnifying glass comprising a magnifying glass element held in a holder element, said magnifying glass element having a cylindrical portion and a convexly curved lens portion superposed thereon which is rotationally symmetrical with respect to the cylinder axis, said sensor magnifying glass further having a plotter coil disposed coaxially with the cylindrical portion, characterized in that the plotter coil (11) is secured on the cylindrical portion (2) in the region between the circumferential face of the cylindrical portion (2) and the course of a peripheral light ray (20′) entering an outer edge of the lens portion (3) as it passes through the cylindrical portion (2).

2. A sensor magnifying glass as defined by claim 1, characterized in that the plotter coil (11) is secured in a groove of the circumferential wall of the cylindrical portion (2).

3. A sensor magnifying glass as defined by claim 1, characterized in that the cylindrical portion (2) is inserted into a through bore in the holder element (4).

4. A sensor magnifying glass as defined by claim 3, characterized in that the plotter coil (11) is secured in a groove of the circumferential wall of the cylindrical portion (2).

5. A sensor magnifying glass as defined by claim 3, characterized in that the magnifying glass element and the holder element (4) are comprised of an optically transparent plastic material, such as acrylic.

6. A sensor magnifying glass as defined by claim 5, characterized in that the plotter coil (11) is secured in a groove of the circumferential wall of the cylindrical portion (2).

* * * * *